(12) United States Patent
Tokusho et al.

(10) Patent No.: US 7,421,447 B2
(45) Date of Patent: Sep. 2, 2008

(54) METHOD, SYSTEM AND PROGRAM FOR CONSTRUCTING A DATABASE

(75) Inventors: Yoshitaka Tokusho, Tokyo (JP); Yukio Nakano, Oyama (JP)

(73) Assignee: Hitachi, Ltd., Tokyo (JP)

( * ) Notice: Subject to any disclaimer, the term of this patent is extended or adjusted under 35 U.S.C. 154(b) by 400 days.

(21) Appl. No.: 11/008,246

(22) Filed: Dec. 10, 2004

(65) Prior Publication Data

US 2006/0095462 A1  May 4, 2006

(30) Foreign Application Priority Data

Oct. 28, 2004  (JP)  ............................. 2004-313978

(51) Int. Cl.
G06F 17/00 (2006.01)

(52) U.S. Cl. .................................................... 707/102

(58) Field of Classification Search ............... 707/1–10, 707/100–104.1, 200–205, 102
See application file for complete search history.

(56) References Cited

U.S. PATENT DOCUMENTS

| 5,758,345 A | 5/1998 | Wang |
| 8,487,547 | 11/2002 | Ellison et al. |
| 6,988,102 B2 * | 1/2006 | Rossiter et al. ............... 707/10 |
| 7,035,840 B2 * | 4/2006 | Nakos et al. .................. 707/2 |

* cited by examiner

Primary Examiner—Mohammad Ali
Assistant Examiner—Navneet K Ahluwalia
(74) Attorney, Agent, or Firm—Antonelli, Terry, Stout & Kraus, LLP.

(57) ABSTRACT

Configuration adjustment processing receives database configuration information and parameter adjustment policy information from an application. When database configuration information received from another application exists in DBMS, the configuration adjustment processing reads in the database configuration information and makes adjustment of the inputted database configuration information and the existing database configuration information in accordance with the parameter adjustment policy information. The configuration adjustment processing updates the existing database configuration information on the basis of the adjusted database configuration information.

10 Claims, 15 Drawing Sheets

FIG.6

223 PARAMETER DEFINITION INFO

| 601 PARAMETER | 602 ADJUSTMENT METHOD |
|---|---|
| MAX. VALUE OF NUMBER OF SIMULTANEOUS ACCESSES TO DATABASE | MAX |
| INTERVAL OF GETTING CHECK POINT RECORDS IN DATABASE | MIN |
| SIZE OF DATABASE CACHE | SUM |
| DATABASE STORAGE AREA | UNION |
| ... | |

METHOD, SYSTEM AND PROGRAM FOR CONSTRUCTING A DATABASE

INCORPORATION BY REFERENCE

The present application claims priority from Japanese application JP2004-313978 filed on Oct. 28, 2004, the content of which is hereby incorporated by reference into this application.

BACKGROUND OF THE INVENTION

The present invention relates to a method, system and program for constructing a database.

In applications such as operation management software, multi-media management software and business accounting software, a database management system (DBMS) is sometimes used to manage data used in the applications.

In order to operate such an application on the DBMS, it is necessary to construct a database previously. In the construction of the database, preparation of a database area, assignment of a memory area for the DBMS, setting of parameters for the DBMS and the like are made. The application is a program which operates using the DBMS. The application contains middleware used by some programs.

The DBMS used in such an application constructs the database in accordance with definition information (database configuration information) concerning the setting and the configuration of the database required in the application. In a conventional construction method of the database shown in FIG. 15, a DBMS receives database configuration information in response to a database construction request from an application and constructs a database in accordance with the database configuration information to transmit the result thereof to the application. The database configuration information is prepared in accordance with the requirements of the application by a developer, a manager or the like of the application.

Such a prior art is disclosed in U.S. Pat. Nos. 5,758,345 and 6,487,547. U.S. Pat. No. 5,758,345 discloses a method that a DBMS prepares a database area in accordance with the definition information describing the configuration of the database. U.S. Pat. No. 6,487,547 discloses a method that a DBMS performs setting of execution environment and parameters of a database on the basis of externally inputted information.

When the application is offered as a suite product composed of a plurality of applications, it is sometimes desired to install a plurality of applications in one machine (computer such as a personal computer (PC) and a server) to be used. In the prior art, when a plurality of applications are installed in one machine, separate DBMS resources (execution environment and configuration used by the DBMS, for example, parameters to be set and memory area of the DBMS) are acquired for each application to construct the database.

In this method, since a plurality of applications are installed in one machine, a plurality of DBMS resources exist. The existence of the plurality of DBMS resources in one machine means that memory areas such as text areas and static data areas used by processes of the DBMS corresponding to the applications exist in the duplicate manner. Accordingly, there is a problem that the whole amount of DBMS resources is increased in the machine as compared with the case of only one DBMS resource.

In order to solve the above problem, there is a method that database configuration information optimum to a plurality of applications to be installed in a machine is previously prepared and is used to construct a database to thereby share one DBMS resource with the plurality of applications.

For example, it is supposed that there are three applications A, B and C which can share one DBMS resource to be operated. Database configuration information which is optimum to the applications A, B and C is previously prepared and one DBMS is shared with the three applications to construct the database to thereby make it to possible to prevent excessive resources or loads from being imposed on the machine.

Even in this method, however, the following problem occurs.

It is supposed that database configuration information which is optimum to only the applications A and B is prepared in the system using the applications A and B and one DBMS resource is shared with two applications. When the application C is added later to be used in the system, there is a problem that the DBMS used by the applications A and B is not optimum to the application C and accordingly the application C cannot share the DBMS resource.

Further, there is also a method that database configuration information which is optimum to all applications which can operate while sharing one DBMS resource is previously prepared to thereby construct a database. In this case, the DBMS resource can be shared with all the applications regardless of combination of first installed applications and later added applications.

Even in this case, however, the application C is not used in the system using only the applications A and B, although the DBMS is always required to acquire resources such as a memory area and a disk area for the application C and accordingly resources of the machine are used excessively.

SUMMARY OF THE INVENTION

Accordingly, in view of the above problem, it is an object of the present invention to make it possible to share one DBMS resource with a plurality of applications properly independent of the order of installing the applications and the combination thereof when the plurality of applications are operated by one DBMS resource.

In order to solve the above problem, according to the present invention, the database construction method of constructing a database in a database management system provided in a predetermined computer and used by an application, comprises a step of inputting database configuration information containing execution environment and configuration of the database from a first application, a step of confirming whether database configuration information already inputted from a second application different from the first application is stored in memory means provided in the predetermined computer or not, a step of adjusting contents of the database configuration information inputted from the first application and contents of database configuration information already inputted from the second application and constructing the database in accordance with contents of the adjusted database configuration information when the already inputted database configuration information is stored as a result of the confirmation, and a step of constructing the database in accordance with contents of the database configuration information inputted from the first application when the already inputted database configuration information is not stored as a result of the confirmation.

The database configuration information is definition information describing execution environment and configuration of the database required in the application. The execution environment of the database includes parameters designating the execution environment and an operation method of the DBMS and its set values. The parameters include the size of a memory area used in order for the DBMS to preserve data temporarily. Information concerning the configuration of the database contains information concerning name, size, location and the like of the area for storing the database. The database configuration information is prepared in accordance with the requirements of the application by a developer, a manager or the like of the application.

Adjustment of contents of the database configuration information is to modify the contents of the database configuration information so as to be proper for individual applications. For example, parameter adjustment policy information is used to adjust parameter values of the database configuration information.

The parameter adjustment policy information is a method or a rule for excluding overlap in description of parameters between the database configuration information inputted from the individual applications when the overlap occurs and modifying the set values of the parameters so as to be the database configuration information proper for the individual applications.

The parameter adjustment policy information contains, for example, information indicative of preference order of the parameter values. At this time, the parameter adjustment policy information contains policy that parameter values described in the database configuration information newly inputted from an application are given preference, policy that parameter values described in the database configuration information inputted from another application already operated using the DBMS and preserved within the DBMS are given preference and policy that either database configuration information is not given preference. In case of the policy that either database configuration information is not given preference, both the parameter values of the newly inputted database configuration information and the database configuration information preserved within the DBMS are used to make adjustment.

The present invention includes the database construction system and the database construction program.

Other objects, features and advantages of the invention will become apparent from the following description of the embodiments of the invention taken in conjunction with the accompanying drawings.

BRIEF DESCRIPTION OF THE DRAWINGS

FIG. 6 is a diagram showing an example of parameter definition information in the first embodiment of the present invention;

DETAILED DESCRIPTION OF THE EMBODIMENTS

Best modes for carrying out the present invention are now described in detail with reference to the accompanying drawings.

Principle of System

Figure 1:
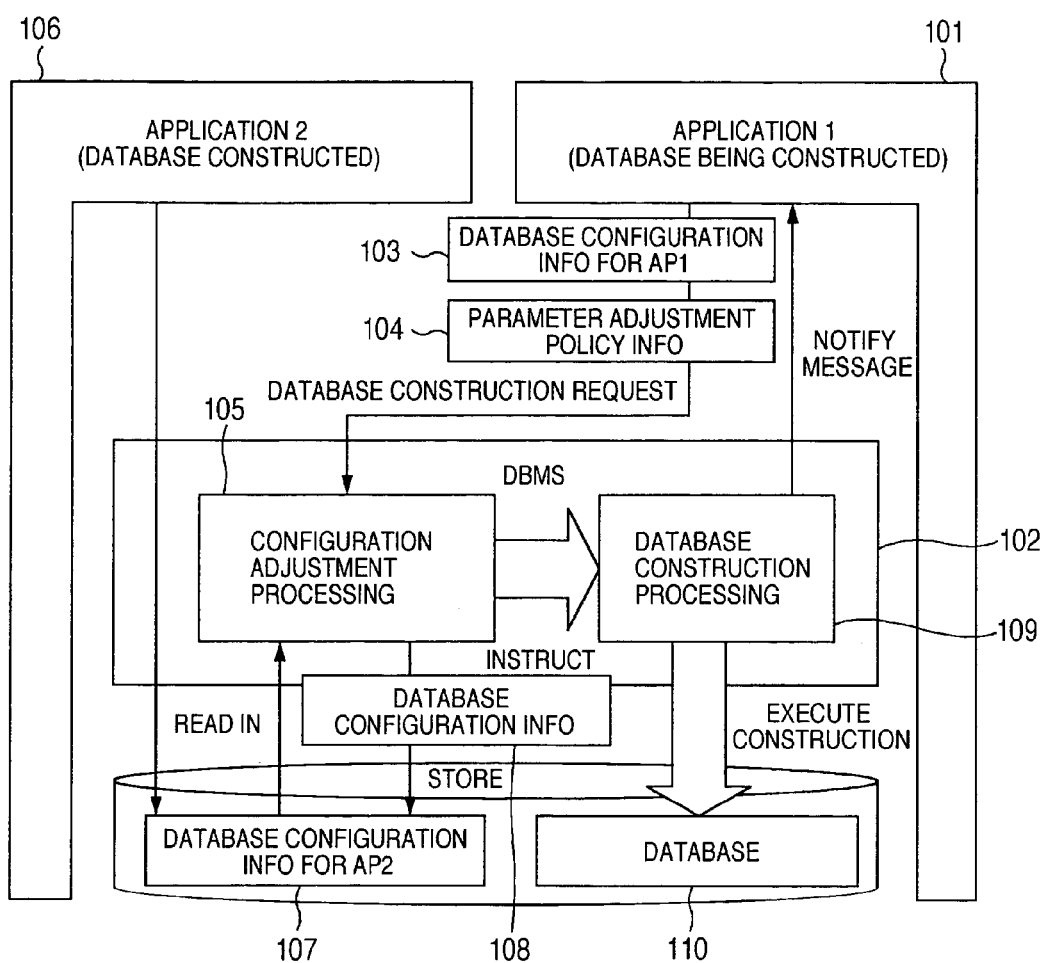
FIG. 1 is a schematic diagram illustrating the principle of a computer system according to an embodiment of the present invention.

FIG. 1 schematically illustrates the principle of a computer system according to an embodiment of the present invention. The computer system (a database construction system in claims) includes applications 101, 106, a DBMS 102 and a database 110 as a fundamental software configuration. The database construction method performed by the DBMS 102 in the computer system has the following Step S:

(1) Configuration adjustment processing 105 receives database configuration information 103 for AP1 (inputted database configuration information 103) and parameter adjustment policy information 104 from the application 101 (first application in claims) in response to a database construction request from the application 101.

(2) When database configuration information 107 for AP2 (existing database configuration information 107) inputted from the other application 106 (second application in claims) using the DBMS 102 (database management system in claims) already exists in the DBMS 102, the configuration adjustment processing 105 reads in the database configuration information 107 existing in the DBMS 102 and makes adjustment between the contents of the inputted database configuration information 103 and the existing database configuration information 107 in accordance with the contents of the parameter adjustment policy information 104.

(3) The configuration adjustment processing 105 overwrites the existing database configuration information 107 and stores the adjusted database configuration information 108 in the DBMS 102.

(4) Database construction processing 109 constructs the database 110 in accordance with the contents of the database configuration information 108. More particularly, for example, the database construction processing 109 acquires a memory area and a disk area used in the construction of the database.

(5) Messages outputted by the DBMS 102 such as end status and processed result message of the configuration adjustment processing 105 and the database construction processing 109 are transmitted to the application 101.

The database construction request issued by the application 101 means that the application 101 requires the DBMS 102 to start the construction processing of the database. Concretely, the database construction request from the application is implemented through interfaces such as commands and functions for the database construction provided by the DBMS 102.

The database configuration information (103, 107 and 108) is definition information describing setting (execution environment in claims) and configuration of the database required in the application. The following information is described in the database configuration information:

(1) Setting of Database: parameters and its set values designating the execution environment and operation method of the DBMS 102; and
(2) Configuration of Database: name, size, place and the like of area for storing the database 110.

The parameter adjustment policy information 104 is information describing the rule for excluding overlap of parameters between the database configuration information (103 and 107) and for modifying the set values of the DBMS parameters. Any of the followings is described in the parameter adjustment policy information 104:

(1) The values of parameters described in the existing database configuration information 107 are given preference. For example, this is effective when the database is constructed in the corresponding manner to a plurality of applications of the same version constituting an integrated software product;
(2) The values of parameters described in the inputted database configuration information 103 is given preference. For example, when the application is versioned up, this is effective when the database is constructed in the corresponding manner to a new application; and
(3) Any of the above values is not given preference and both parameter values of the existing database configuration information 107 and the inputted database configuration information 103 are used to make adjustment. For example, this is effective when the database is constructed in the corresponding manner to an application of a product different from an existing application.

Consequently, when it is desired that a plurality of applications are operated by one DBMS resource (execution environment and configuration used by the DBMS, for example, parameters to be set and memory area of the DBMS), the contents of the database configuration information inputted from individual applications can be modified to be optimum to all applications. Accordingly, one DBMS resource can be shared with the plurality of applications independent of the order of installing the applications and the combination thereof.

First Embodiment

Referring now to FIGS. 2 to 11, a first embodiment of the present invention is described.

<Configuration of System>

Figure 2:
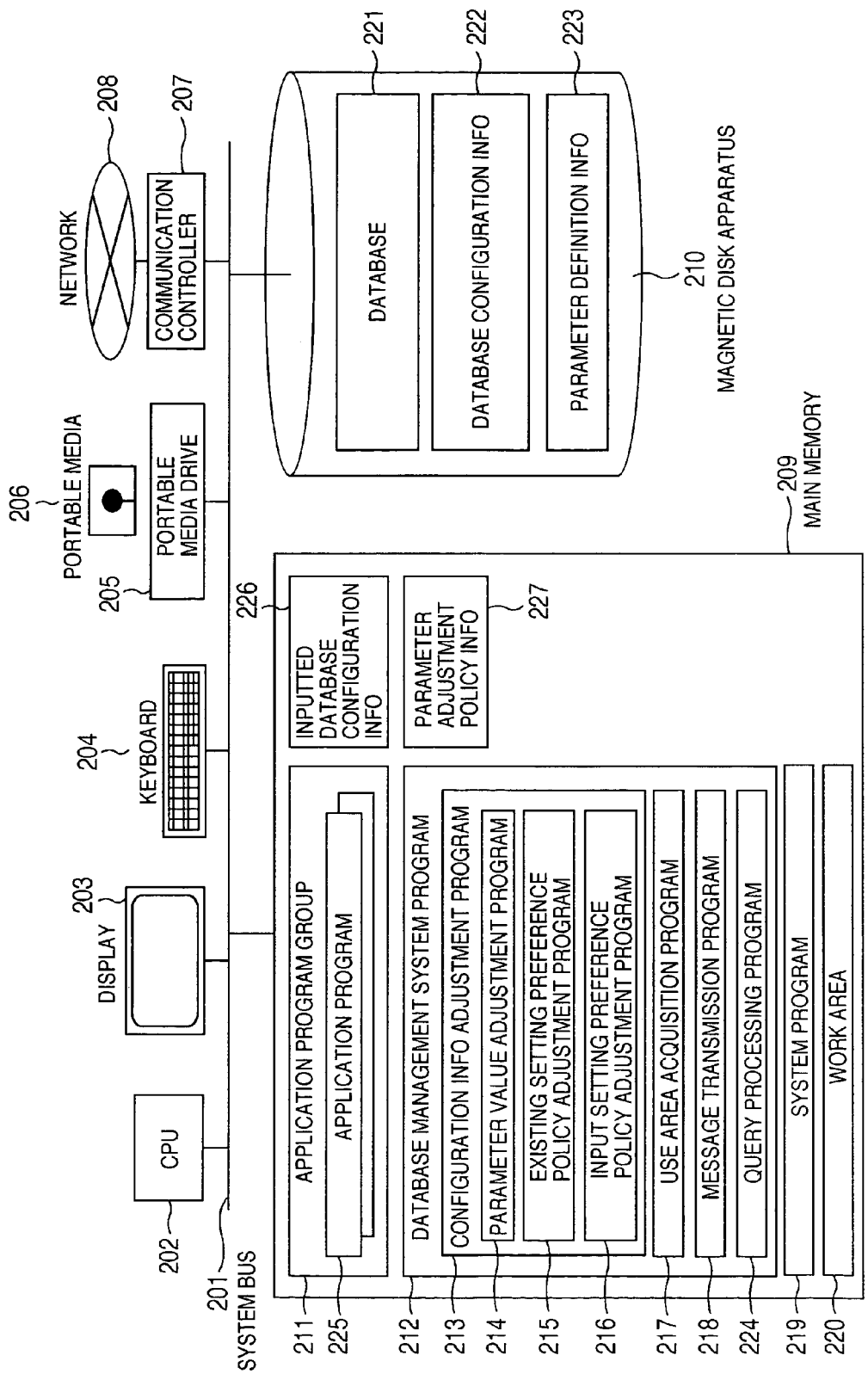
FIG. 2 is a schematic diagram illustrating a configuration of a computer system according to a first embodiment of the present invention.

FIG. 2 is a schematic diagram illustrating a computer system according to the first embodiment of the present invention.

As shown in FIG. 2, the computer system in which a DBMS which implements a database construction method of the embodiment is installed includes a CPU (Central Processing Unit) 202, a display 203, a keyboard 204, a portable media drive 205, a communication controller 207, a main memory 209, a magnetic disk apparatus 210 and a system bus 201. The computer system of the embodiment has the configuration similar to the general computer system.

The CPU 202 is to execute programs used in the embodiment. The display 203 is to display execution state and execution result of processing. The keyboard 204 is to input commands for instructing execution and the like of a database management system program 212. The portable media disk 205 is to read and write data to a flexible disk, a magnet-optical disk and a portable media 206 such as a direct-read-after-write magnet-optical disk. The communication controller 207 is to make communication through a network 208. The main memory 209 is to store various programs used in the present invention and temporary data. The magnetic disk apparatus 210 is to store a database and definition information concerning the database. The system bus 201 connects the above elements to one another.

A database 221, database configuration information 222 and parameter definition information 223 are stored in the magnetic disk apparatus 210 (memory means in claims). Data used by application program group 211 and definition information concerning the database are stored in the database 221. The database configuration information 222 is definition information describing setting and configuration of the database required in the application program group 211 and the processed result by the configuration information adjustment program 213 of information read out from the magnetic disk apparatus 210 by a configuration information adjustment program 213 is written in the magnetic disk apparatus 210. The parameter definition information 223 is definition information describing the adjustment method of parameters of the database configuration information 222. The parameter definition information 223 is given by the database management system program 212. The parameter definition information 222 is used in order for the configuration information adjustment program 213 to get the adjustment method of parameters.

In the embodiment, the method of giving the parameter adjustment method to the configuration information adjustment program 213 by means of the parameter definition information 223 is described, although another method may be used if the parameter adjustment method can be given to the configuration information adjustment program 213 properly. As such a method, there is a method of setting information indicative of the parameter adjustment method in the configuration information adjustment program 213 as code data to thereby provide it together with the program.

The application program group 211, the database management system program 212, a system program 219, a work area 220, inputted database configuration information 226 and parameter adjustment policy information 227 are stored in the main memory 209. Programs used in the embodiment are set in the main memory 209 from the portable media 206 through the portable media drive 205 or from the network 208 through the communication controller 207.

The application program group 211 is one or more collected application programs 225. The application program 225 utilizes the function provided by the database management system program 212 to thereby offer service to users. Further, the application program 225 inputs the inputted database configuration information 226 and the parameter adjustment policy information 227 to the database management system program 212.

The inputted database configuration information 226 is information inputted from the application program 225 to the database management system program 212 and is given together with the application program 225. The parameter adjustment policy information 227 is information concerning a parameter adjustment rule designated to the database management system program 212 by the application program 225. The parameter adjustment policy information 227 designates the policy for giving preference to a new set value, the policy for giving preference to an existing set value or the policy for using both values to make adjustment without giving preference to either value. Further, the parameter adjustment policy information 227 may be previously set in the application program 225 or may be set when the user installs the application program 225 in the computer system.

The database management system program 212 includes the configuration information adjustment program 213, a use area acquisition program 217, a message transmission program 218 and a query processing program 224. The database management system program 212 receives the inputted database configuration information 226 and the parameter adjustment policy information 227 from the application program group 211.

The configuration information adjustment program 213 includes a parameter value adjustment program 214, an existing setting preference policy adjustment program 215 and an input setting preference policy adjustment program 216. The configuration information adjustment program 213 is a program for making adjustment of the inputted database configuration information 226 received from the application program 225 and the database configuration information 222 stored in the magnetic disk apparatus 210 to output its result. The processing procedure of the configuration information adjustment program 213 will be described with reference to FIG. 4.

The parameter value adjustment program 214 is a program for making adjustment of the database configuration information when the parameter adjustment policy is the policy that either is not given preference. The processing procedure of the parameter value adjustment program 214 will be described with reference to FIG. 7.

The existing setting preference policy adjustment program 215 is a program for making adjustment of the database configuration information when the parameter adjustment policy is the policy that the existing database configuration information is given preference. The processing procedure of the existing setting preference policy adjustment program 215 will be described with reference to FIG. 8.

The input setting preference policy adjustment program 216 is a program for making adjustment of the database configuration information when the parameter adjustment policy is the policy that the inputted database configuration information is given preference. The processing procedure of the input setting preference policy adjustment program 216 will be described with reference to FIG. 9.

The use area acquisition program 217 gets the database configuration information 222 and acquires the memory area and the disk area used by DBMS 212 in accordance with the contents described in the database configuration information 222. The processing procedure of the use area acquisition program 217 will be described with reference to FIG. 10.

The message transmission program 218 is a program for transmitting end status and messages outputted by the configuration adjustment program 213 and the use area acquisition program 217 to the application program group 211. The processing procedure of the message transmission program 218 will be described with reference to FIG. 11.

The query processing program 224 is a program for receiving a database query request from the application program group 211 and returning its processed result to a request source. The query processing program 224 is the same as the program provided in the general DBMS.

The system program 219 provides fundamental functions for executing programs used in the embodiment and including input/output function of data between peripheral apparatuses and the computer system.

The work area 220 stores data required temporarily upon execution of a program.

<Outline of Database Construction Processing>

Figure 3:
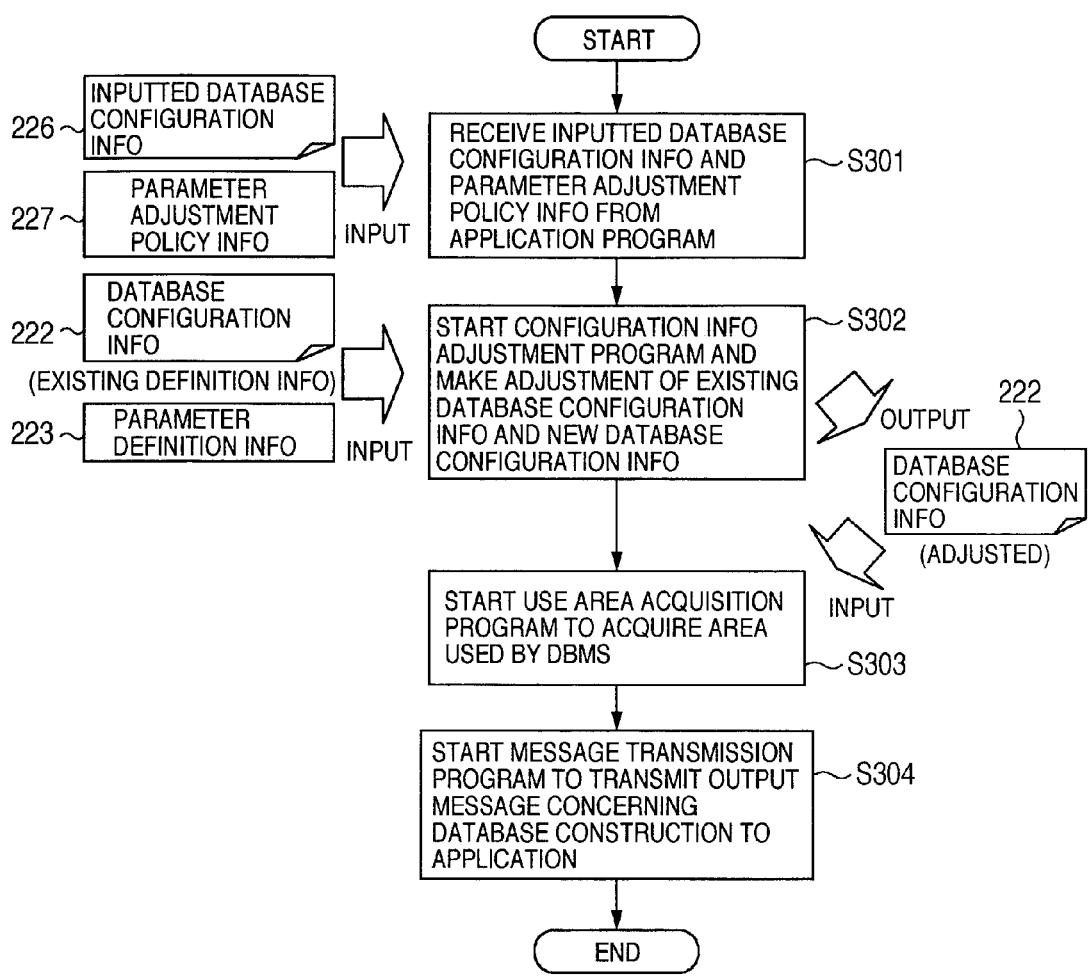
FIG. 3 is a flowchart showing an outline of construction processing of a database in the first embodiment of the present invention.

FIG. 3 is a flowchart showing an outline of construction processing of the database according to the first embodiment of the present invention. Referring to FIG. 3, the construction of the database by the database management system program 212 is made by the following procedure (refer to FIG. 2 properly).

First, the database management system program 212 receives the inputted database configuration information 226 and the parameter adjustment policy information 227 from the application program 225 (Step S301). Then, the database management system program 212 starts the configuration information adjustment program 213 and reads out the existing database configuration information 222 and the parameter definition information 223 inputted from another application using the DBMS to thereby make adjustment of the existing database configuration information 222 and the inputted database configuration information 226 in accordance with the parameter adjustment policy information 227 (Step S302). As a result of the adjustment, the adjusted database configuration information 222 is stored in the magnetic disk apparatus 210. Subsequently, the database management system program 212 starts the use area acquisition program 217 to acquire the area used by DBMS 221 in accordance with the contents of the database configuration information 222 (Step S303). Further, the database management system program 212 starts the message transmission program 218 to transmit the end status and the messages concerning the database construction outputted by the configuration adjustment program 213 and the use area acquisition program 217 to the application program 211 (Step S304).

The processing in Step S302 is performed by the configuration information adjustment program 213. The detailed processing procedure of the configuration information adjustment program 213 will be described with reference to FIG. 4. The processing in Step S303 is performed by the use area acquisition program 217. The detailed processing procedure of the use area acquisition program 217 will be described with reference to FIG. 10. The processing in Step S304 is performed by the message transmission program 218. The detailed processing procedure of the message transmission program 218 will be described with reference to FIG. 11.

<Configuration Information Adjustment Program>

Figure 4:
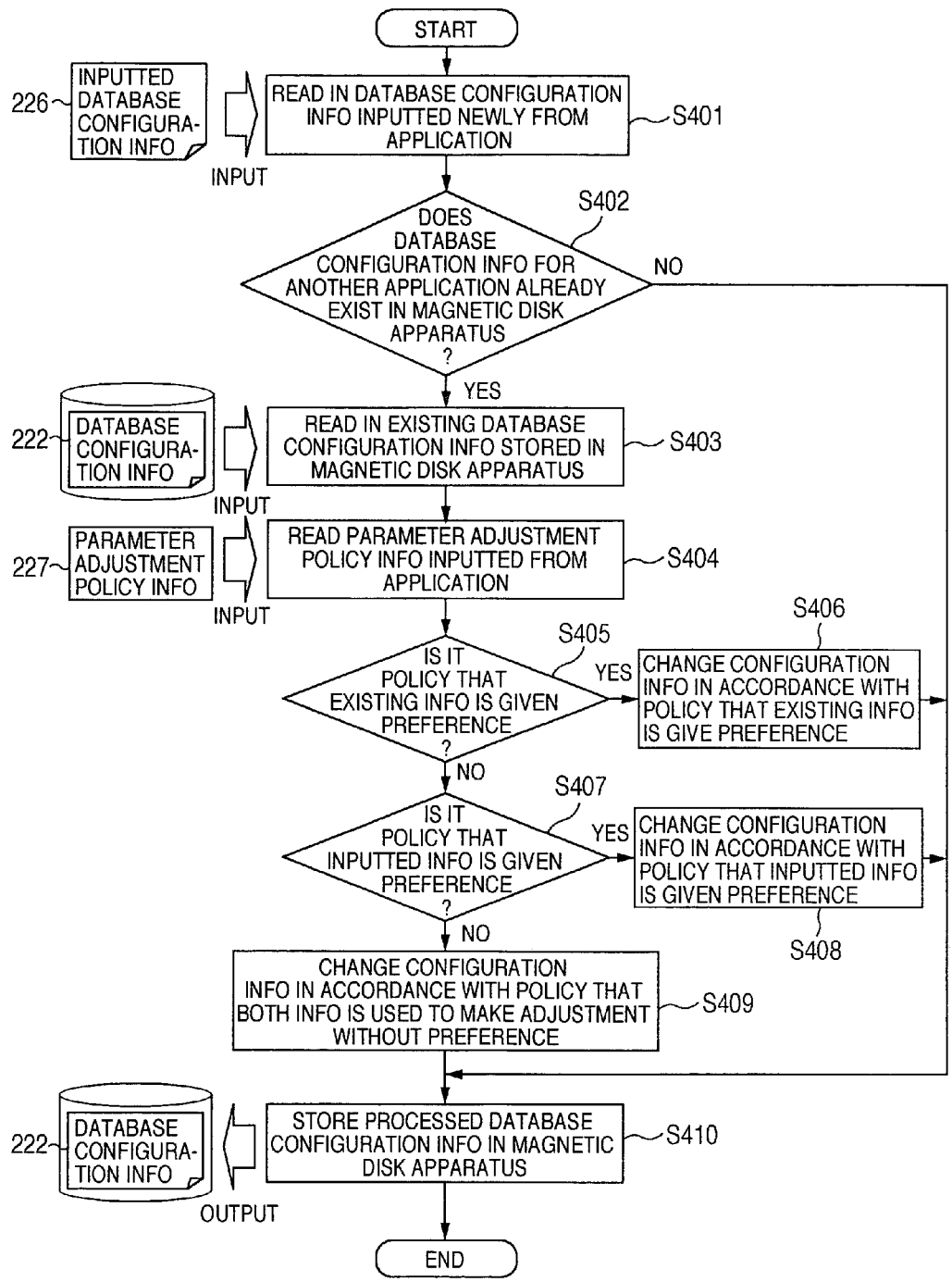
FIG. 4 is a flowchart showing a processing procedure of a configuration information adjustment program in the first embodiment of the present invention.

FIG. 4 is a flowchart showing the processing procedure of the configuration information adjustment program in the first embodiment of the present invention and showing a detailed procedure of the processing in Step S302 of FIG. 3. Referring to FIG. 4, the processing procedure of the configuration information adjustment program 213 is as follows (refer to FIG. 2 properly).

First, the configuration information adjustment program 213 reads in the inputted database configuration information 226 newly inputted from the application program 225 (Step S401). Then, the configuration information adjustment program 213 judges whether the existing database configuration information 222 for another application using the DBMS already exists in the magnetic disk apparatus 210 or not (Step S402). When it exists (YES of Step S402), the configuration information adjustment program 213 reads in the existing database configuration information 222 stored in the magnetic disk apparatus 210 (Step S403). The configuration information adjustment program 213 reads the parameter adjustment policy information 227 inputted from the application program 225 (Step S404).

The configuration information adjustment program 213 confirms whether the contents of the parameter adjustment policy information 227 are the policy that the parameter values described in the existing database configuration information 222 are given preference or not (Step S405). When it is the policy that existing information is given preference (YES of Step S405), the configuration information adjustment program 213 starts the existing setting preference policy adjustment program 215 to modify the database configuration information 222 (Step S406) and the process proceeds to Step S410. When it is not the policy that the existing information is given preference (NO of Step S405), the configuration information adjustment program 213 confirms whether the contents of the parameter adjustment policy information 227 are the policy that the parameter values described in the inputted database configuration information 226 are given preference or not (Step S407). When it is the policy that the inputted database configuration information 226 is given preference (YES of Step S407), the configuration information adjustment program 213 starts the input setting preference policy adjustment program 216 to modify the database configuration information 222 (Step S408) and the process proceeds to Step S410. When it is not the policy that the inputted database configuration information is given preference (NO of Step S407), the configuration information adjustment program 213 judges that it is the policy that either information is not given preference, that is, the policy that both information is used to make adjustment without preference order and starts the parameter value adjustment program 214 to modify the database configuration information 222 (Step S409). The configuration information adjustment program 213 stores the processed database configuration information 222 in the magnetic disk apparatus 210 (Step S410). Further, in Step S402, when the database configuration information 222 does not exist in the magnetic disk apparatus 210 (NO of Step S402), the process proceeds to Step S410.

The processing in Step S406 is performed by the existing setting preference policy adjustment program 215. The detailed processing procedure of the existing setting preference policy adjustment program 215 will be described with reference to FIG. 8. The processing in Step S408 is performed by the input setting preference policy adjustment program 216. The detailed processing procedure of the input setting preference policy adjustment program 216 will be described with reference to FIG. 9. The processing in Step S409 is performed by the parameter value adjustment program 214. The detailed processing procedure of the parameter value adjustment program 214 will be described with reference to FIG. 7.

<Example of Database Configuration Information>

Figure 5:
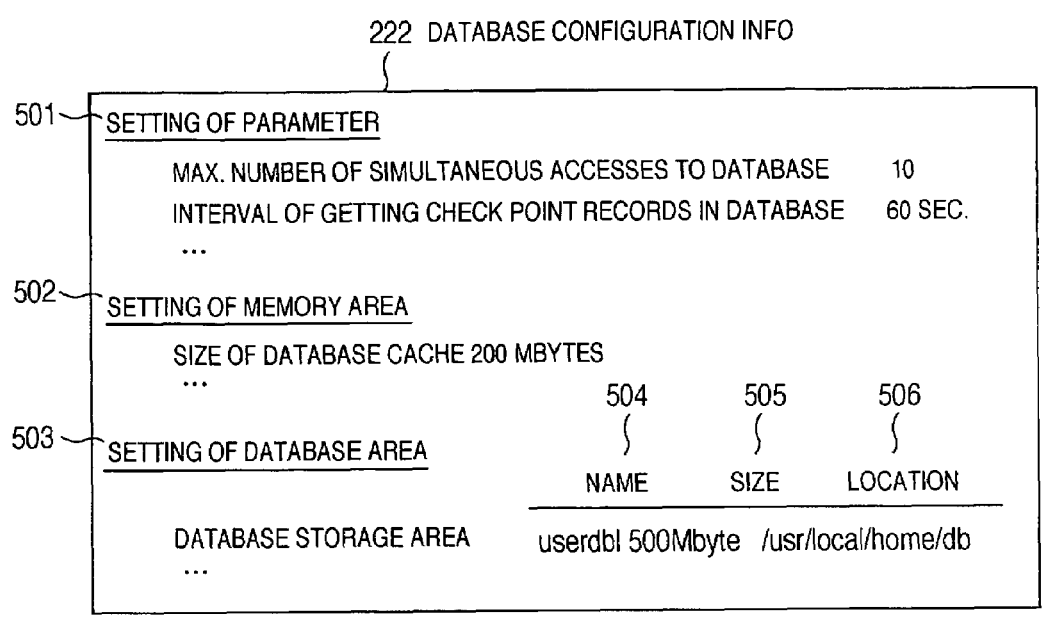
FIG. 5 is a diagram showing an example of database configuration information in the first embodiment of the present invention.

FIG. 5 shows an example of the database configuration information in the first embodiment of the present invention. The database configuration information (222 and 226) is the definition information describing setting and configuration of the database required in the application.

The database configuration information shown in FIG. 5 includes a field (setting of parameters 501) in which parameters of the DBMS are set, a field (setting of memory area 502) in which memory area is set and a field (setting of database area 503) in which database area is set.

The field (setting of parameters 501) in which parameters of the DBMS are set describes parameters for designating execution environment and operation method concerning the DBMS and set values thereof. The parameters described in this field (setting of parameters 501) includes a limited value of the number of simultaneous accesses to the database, an interval of getting check point records in the database (log information for failure recovery) and the like.

For example, the parameter setting field (setting of parameters 501) of the database configuration information 222 of FIG. 5 describes setting indicating that the simultaneous accesses to the database are limited to 10 at the maximum and check point records in the database are gotten at intervals of 60 seconds.

The field (setting of memory area 502) in which memory area is set describes the size of memory area such as buffer cache in which the DBMS preserves data temporarily or the like. For example, the memory area setting field (setting of memory area 502) of the database configuration information 222 of FIG. 5 describes setting indicating that a database cache used by the DBMS is gotten in the size of 200 Mbytes.

The field (setting of database area 503) in which database area is set describes names 504, sizes 505, locations 506 and the like of area for storing database. For example, the database area setting field (setting of database area 503) of the database configuration information 222 of FIG. 5 describes setting indicating that a database area having the size of 500 Mbytes is prepared in the location indicated by a directory path /usr/local/home/db in the name of userdb1.

Information required at the minimum in description of the embodiment is shown in FIG. 5, although other information may be added or as far as information concerning setting and configuration of the database including setting of parameters, setting of memory areas, setting of database areas and the like can be gotten, information may be expressed in any other format. The database configuration information 222 shown in FIG. 5 can be inputted in the dialog manner through the application program group 211 by means of the display 203 and the keyboard 204.

<Example of Parameter Definition Information>

FIG. 6 shows an example of the parameter definition information in the first embodiment of the present invention. The parameter definition information 223 is information defining the adjustment method of parameters designating execution environment and operation method of DBMS and is used when the parameter adjustment policy information 227 indicates the policy that adjustment is made without giving preference to either. As shown in FIG. 6, the parameter definition information 223 includes a field (parameter 601) in which parameters of DBMS are described and a field (adjustment method 602) in which adjustment methods of parameters are described.

The field (parameter 601) for describing parameters describes parameters of DBMS set in the database configuration information 222.

The field (adjustment method 602) for describing the adjustment methods of parameters describes the adjustment methods for the parameters described in the field (parameter 601) describing the parameters. Any of the followings is designated in the adjustment method of parameters.

(1) Getting of maximum value (MAX)
(2) Getting of minimum value (MIN)
(3) Getting of sum (SUM)
(4) Getting of union (UNION)

In the embodiment, the adjustment method of the database configuration information is described in which any of getting of a maximum value (MAX), getting of a minimum value (MIN), getting of a sum (SUM) and getting of a union (UNION) is used as the adjustment method of parameters, although the adjustment method may use a combination of two or more adjustment methods or another adjustment method may be used.

The parameter definition information 223 of FIG. 6 shows that the adjustment of parameter indicating the maximum value of the number of simultaneous accesses to the database is made by getting the maximum value (MAX), the adjustment of parameter indicating the interval of getting check point records in the database is made by getting the minimum value (MIN), the adjustment of parameter indicating the size of the database cache is made by getting a sum (SUM) and the adjustment of parameter indicating the database storage area is made by getting a union (UNION).

Information required at the minimum in description of the embodiment is shown in FIG. 6, although other information may be added or as far as the adjustment method of parameter can be defined, information may be expressed in any other format. Further, the parameter definition information 223 shown in FIG. 6 can be inputted in the dialog manner by means of the display 203 and the keyboard 204.

<Parameter Value Adjustment Program>

Figure 7:
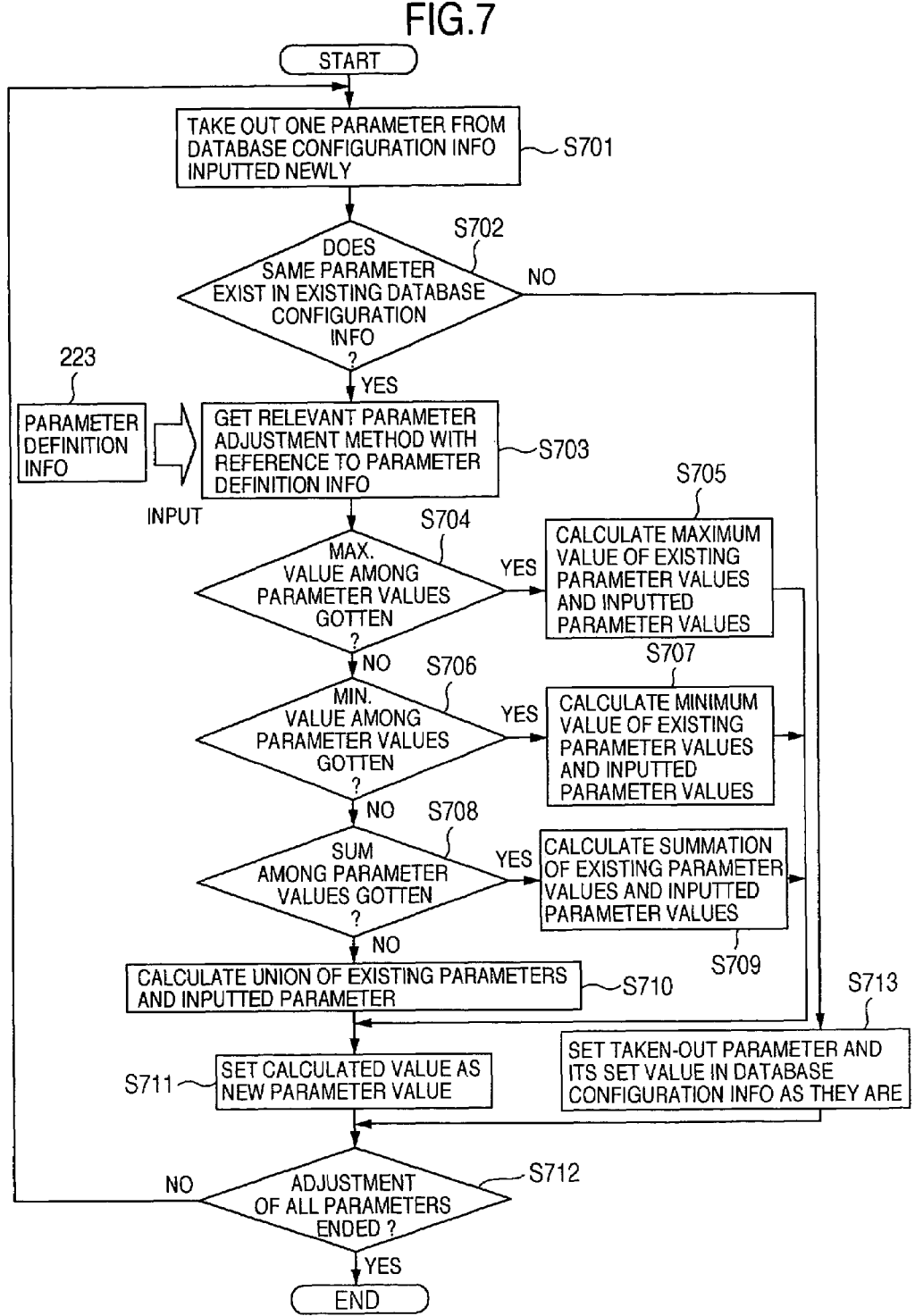
FIG. 7 is a flowchart showing a processing procedure of a parameter value adjustment program in the first embodiment of the present invention.

FIG. 7 is a flowchart showing a processing procedure of the parameter value adjustment program in the first embodiment of the present invention and showing a detailed procedure of the processing in Step S409 of FIG. 4. Referring to FIG. 7, the processing procedure of the parameter value adjustment program 214 is as follows (refer to FIG. 2 properly).

First, the parameter value adjustment program 214 takes out one parameter from the database configuration information 226 inputted newly (Step S701). Then, the parameter value adjustment program 214 confirms whether the same parameter as the taken-out parameter exists in the existing database configuration information 222 or not (Step S702). When the same parameter exists (YES of Step S702), the parameter value adjustment program 214 gets the relevant parameter adjustment method with reference to the parameter definition information 223 (Step S703).

The parameter value adjustment program 214 confirms whether the parameter adjustment method is to get a maximum value (MAX) among the parameter values or not (Step S704). When it is to get the maximum value (MAX) (YES of Step S704), the parameter value adjustment program 214 calculates the maximum value (MAX) of parameter values described in the inputted database configuration information 226 and the existing database configuration information 222 (Step S705) and the process proceeds to Step S711. When the parameter adjustment method is not to get the maximum value (MAX) (NO of Step S704), the parameter value adjustment program 214 confirms whether the parameter adjustment method is to get a minimum value (MIN) among the parameter values or not (Step S706). When it is to get the minimum value (MIN) (YES of Step S706), the parameter value adjustment program 214 calculates the minimum value (MIN) of parameter values described in the inputted database configuration information 226 and the existing database configuration information 222 (Step S707) and the process proceeds to Step S711. When the parameter adjustment method is not to get the minimum value (MIN) (NO of Step S706), the parameter value adjustment program 214 confirms whether the parameter adjustment method is to get a sum (SUM) or not (Step S708). When it is to get the sum (SUM) (YES of Step S708), the parameter value adjustment program 214 calculates the sum (SUM) of parameter values described in the inputted database configuration information 226 and the existing database configuration information 222 (Step S709) and the process proceeds to Step S711. When the parameter adjustment method is not to get the sum (SUM) (NO of Step S708), the parameter value adjustment program 214 recognizes that the parameter adjustment method is to get a union (UNION) and calculates the union (UNION) of parameter values described in the inputted database configuration information 226 and the existing database configuration information 222 (Step S710). Then, the process proceeds to Step S711.

In Step S711, the calculated value is set as a new parameter value. In Step S702, when the same parameter does not exist (NO of Step S702), the parameter value adjustment program 214 sets the parameter taken out from the inputted database configuration information 226 in Step S701 and its set value in the database configuration information 222 as they are (Step S713). After Step S711 or S713, the parameter value adjustment program 214 confirms whether adjustment of all parameters described in the inputted database configuration information 226 is ended or not (Step S712). When adjustment of all parameters is not ended (NO of Step S712), the process returns to Step S701 and when adjustment of all parameters is ended (YES of Step S712), the processing is ended.

<Existing Setting Preference Policy Adjustment Program>

Figure 8:
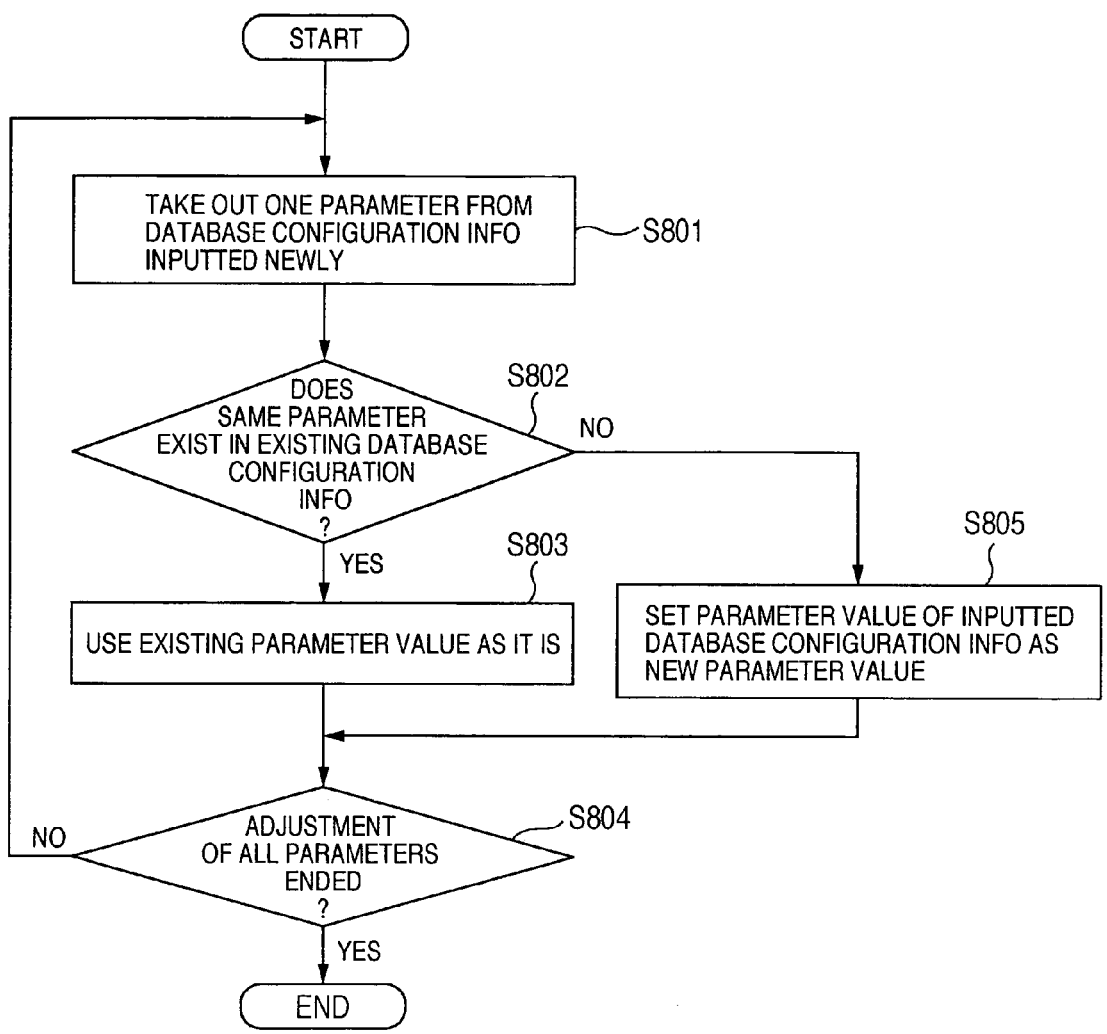
FIG. 8 is a flowchart showing a processing procedure of an existing setting preference policy adjustment program in the first embodiment of the present invention.

FIG. 8 is a flowchart showing a processing procedure of the existing setting preference policy adjustment program in the first embodiment of the present invention and showing a detailed procedure of the processing in Step S406 of FIG. 4. Referring to FIG. 8, the processing procedure of the existing setting preference policy adjustment program 215 is as follows (refer to FIG. 2 properly).

First, the existing setting preference policy adjustment program 215 takes out one parameter from the database configuration information 226 inputted newly (Step S801). The existing setting preference policy adjustment program 215 confirms whether the same parameter as the taken-out parameter exists in the existing database configuration information 222 or not (Step S802). When the same parameter exists (YES of Step S802), the existing setting preference policy adjustment program 215 uses the existing parameter value as it is (Step S803). When the same parameter does not exist (NO of Step S802), the existing setting preference policy adjustment program 215 sets the parameter value of the inputted database configuration information 226 as a new parameter value (Step S805). Thereafter, the existing setting preference policy adjustment program 215 confirms whether adjustment of all parameters described in the inputted database configuration information 226 is ended or not (Step S804). When the adjustment is not ended (NO of Step S804), the process returns to Step S801 and when the adjustment is ended (YES of Step S804), the processing is ended.

<Input Setting Preference Policy Adjustment Program>

Figure 9:
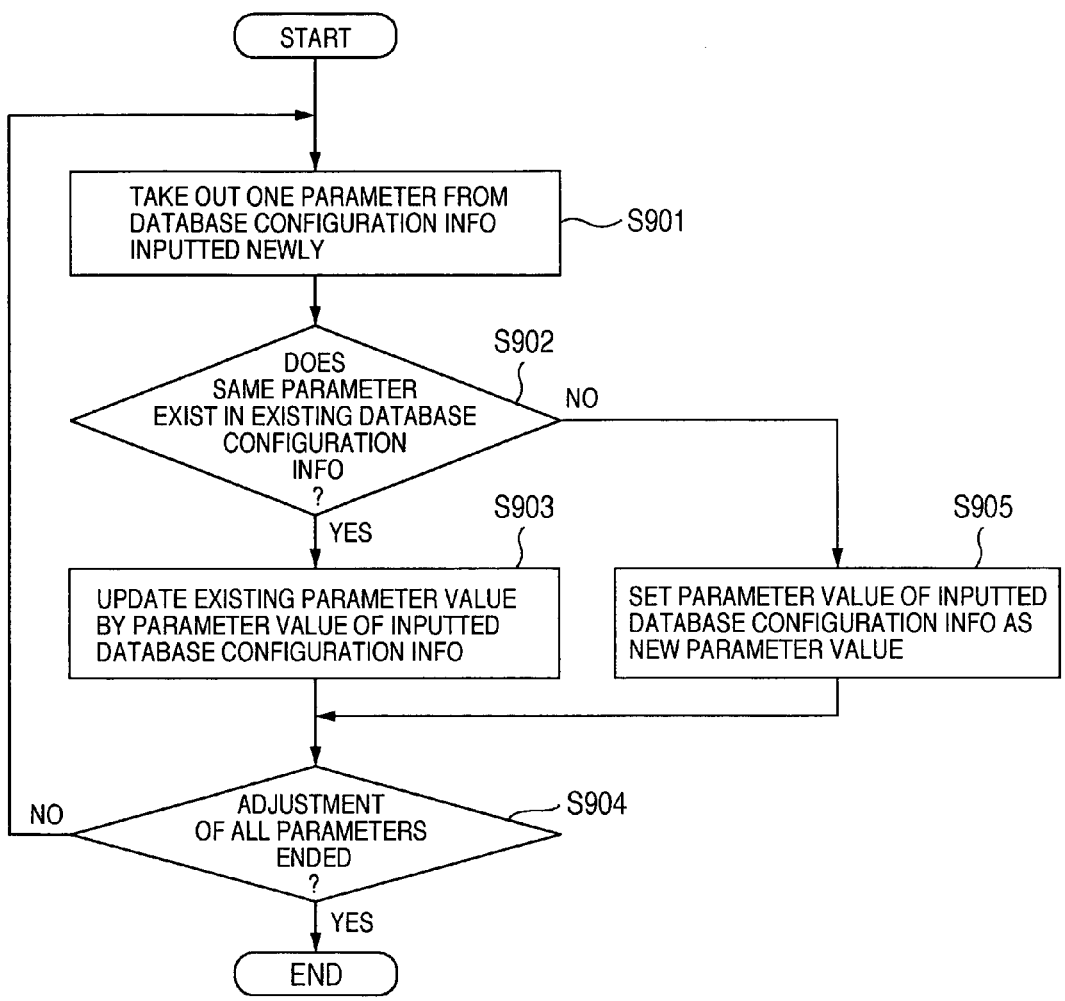
FIG. 9 is a flowchart showing a processing procedure of an input setting preference policy adjustment program in the first embodiment of the present invention.

FIG. 9 is a flowchart showing a processing procedure of the input setting preference policy adjustment program in the first embodiment of the present invention and showing a detailed procedure of the processing in Step S408 of FIG. 4. Referring to FIG. 9, the processing procedure of the input setting preference policy adjustment program 216 is as follows (refer to FIG. 2 properly).

First, the input setting preference policy adjustment program 216 takes out one parameter described in the inputted database configuration information 226 inputted newly (Step S901). The input setting preference policy adjustment program 216 confirms whether the same parameter as the taken-out parameter exists in the existing database configuration information 222 or not (Step S902). When the same parameter exists (YES of Step S902), the input setting preference policy adjustment program 216 updates the existing parameter value by the parameter value of the inputted database configuration information 226 (Step S903). When the same parameter does not exist (NO of Step S902), the input setting preference policy adjustment program 216 sets the parameter value of the inputted database configuration information 226 as a new parameter value (Step S905). Thereafter, the input setting preference policy adjustment program 216 confirms whether adjustment of all parameters described in the inputted database configuration information 226 is ended or not (Step S904). When the adjustment is not ended (NO of Step S904), the process returns to Step S901 and when the adjustment is ended (YES of Step S904), the processing is ended.

<Use Area Acquisition Program>

Figure 10:
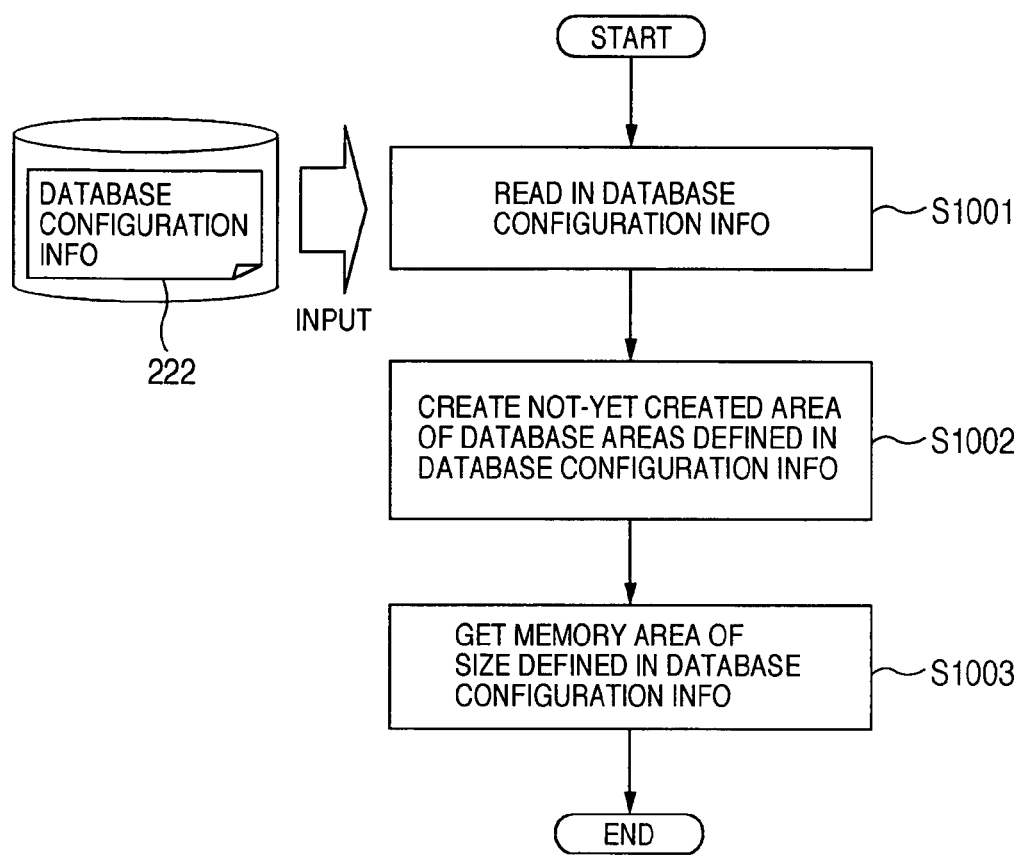
FIG. 10 is a flowchart showing a processing procedure of a use area acquisition program in the first embodiment of the present invention.

FIG. 10 is a flowchart showing a processing procedure of the use area acquisition program in the first embodiment of the present invention and showing a detailed procedure of the processing in Step S303 of FIG. 3. Referring to FIG. 10, the processing procedure of the use area acquisition program 217 is as follows (refer to FIG. 2 properly).

First, the use area acquisition program 217 reads in the database configuration information 222 (Step S1001). Then, if there is any not-yet created area in the database areas defined in the database configuration information 222, the use area acquisition program 217 creates the not-yet created area (Step S1002). More particularly, the use area acquisition program 217 acquires a disk area corresponding to the not-yet created area in the magnetic disk apparatus 210. Further, the use area acquisition program 217 gets a memory area defined in the database configuration information 222 (Step S1003).

<Message Transmission Program>

Figure 11:
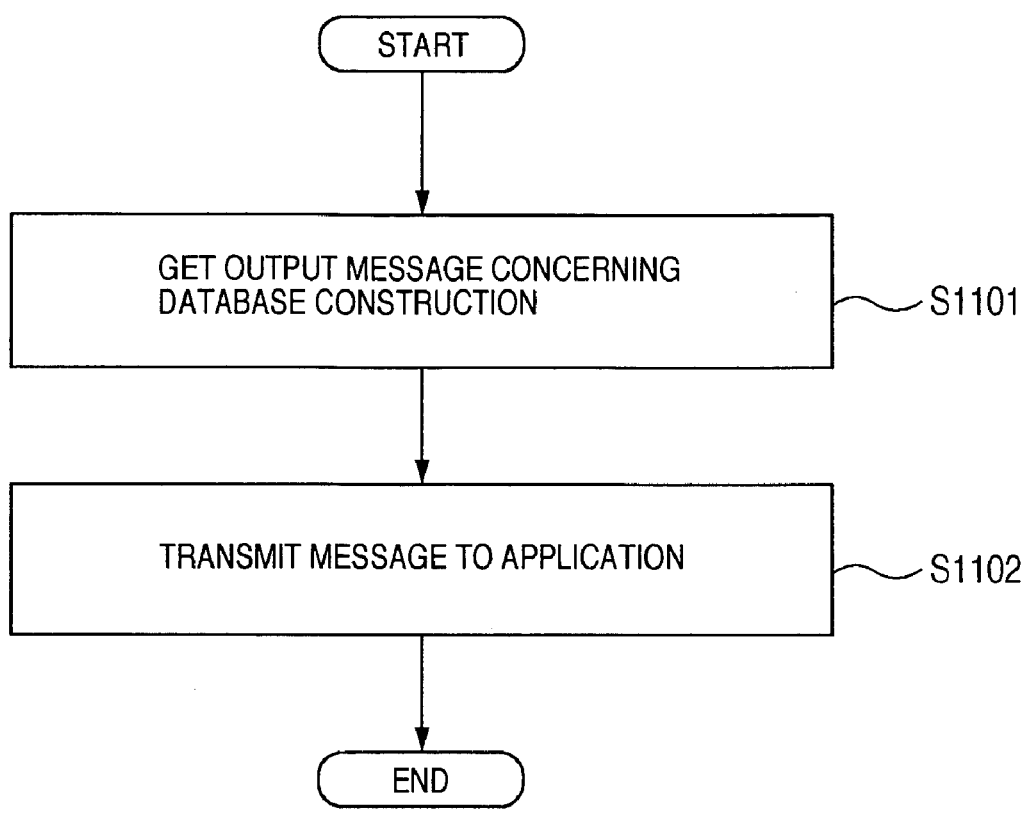
FIG. 11 is a flowchart showing a processing procedure of a message transmission program in the first embodiment of the present invention.

FIG. 11 is a flowchart showing a processing procedure of the message transmission program in the first embodiment of the present invention and showing a detailed procedure of the processing in Step S304 of FIG. 3. Referring to FIG. 11, the processing procedure of the transmission message program 218 is as follows (refer to FIG. 2 properly).

First, the transmission message program 218 gets end status and messages concerning the database construction outputted by the configuration adjustment program 213 and the use area acquisition program 217 (Step S1101). Then, the transmission message program 218 transmits the gotten end status and messages to the application program 225 (Step S1102).

As described above, according to the database construction method of the embodiment, the database configuration information newly inputted from the application and the database configuration information already existing in the DBMS are modified in accordance with the adjustment policy designated from the application, so that one DBMS resource can be shared with the plurality of applications independent of the order of installing the applications and the combination thereof.

According to the adjustment method of the database configuration information of the embodiment, the computer system can be operated while sharing the DBMS resource from the database configuration information optimized to the individual applications and the database configuration information optimum to the plurality of applications can be prepared.

Further, when the plurality of applications are installed in one computer system to be used, it can be avoided that separate DBMS resources are used for each application or the memory area and the disk area are acquired for unused application and accordingly the computer system can be operated without insuring excessive resources.

Moreover, as secondary effects for the fact that the computer system can be operated without insuring excessive resources, the size of the memory and the disk provided in the computer system can be made small and accordingly the cost for purchase of the memory and the disk can be reduced.

Second Embodiment

Figure 12:
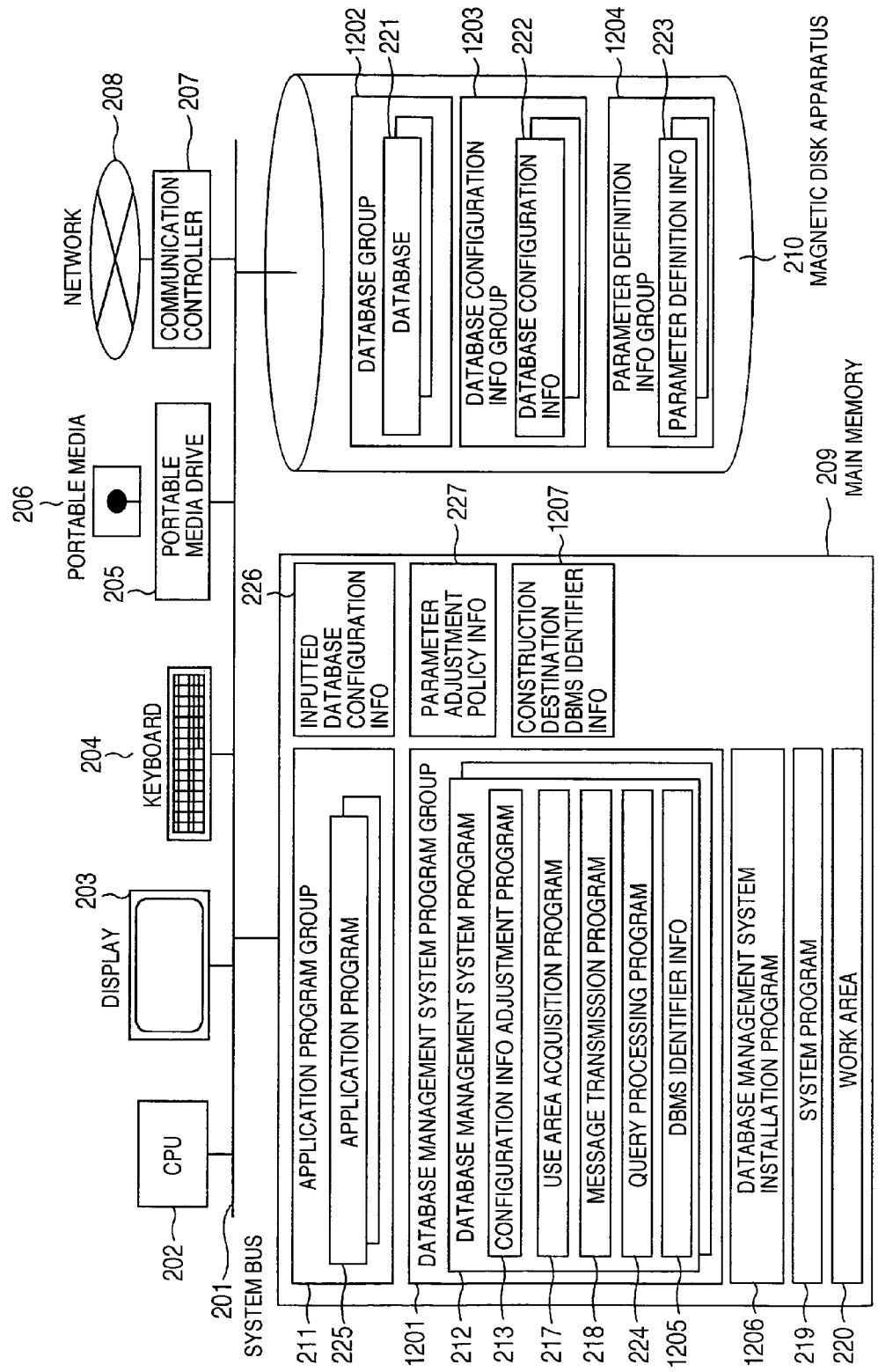
FIG. 12 is a schematic diagram illustrating a computer system according to a second embodiment of the present invention.
Figure 13:
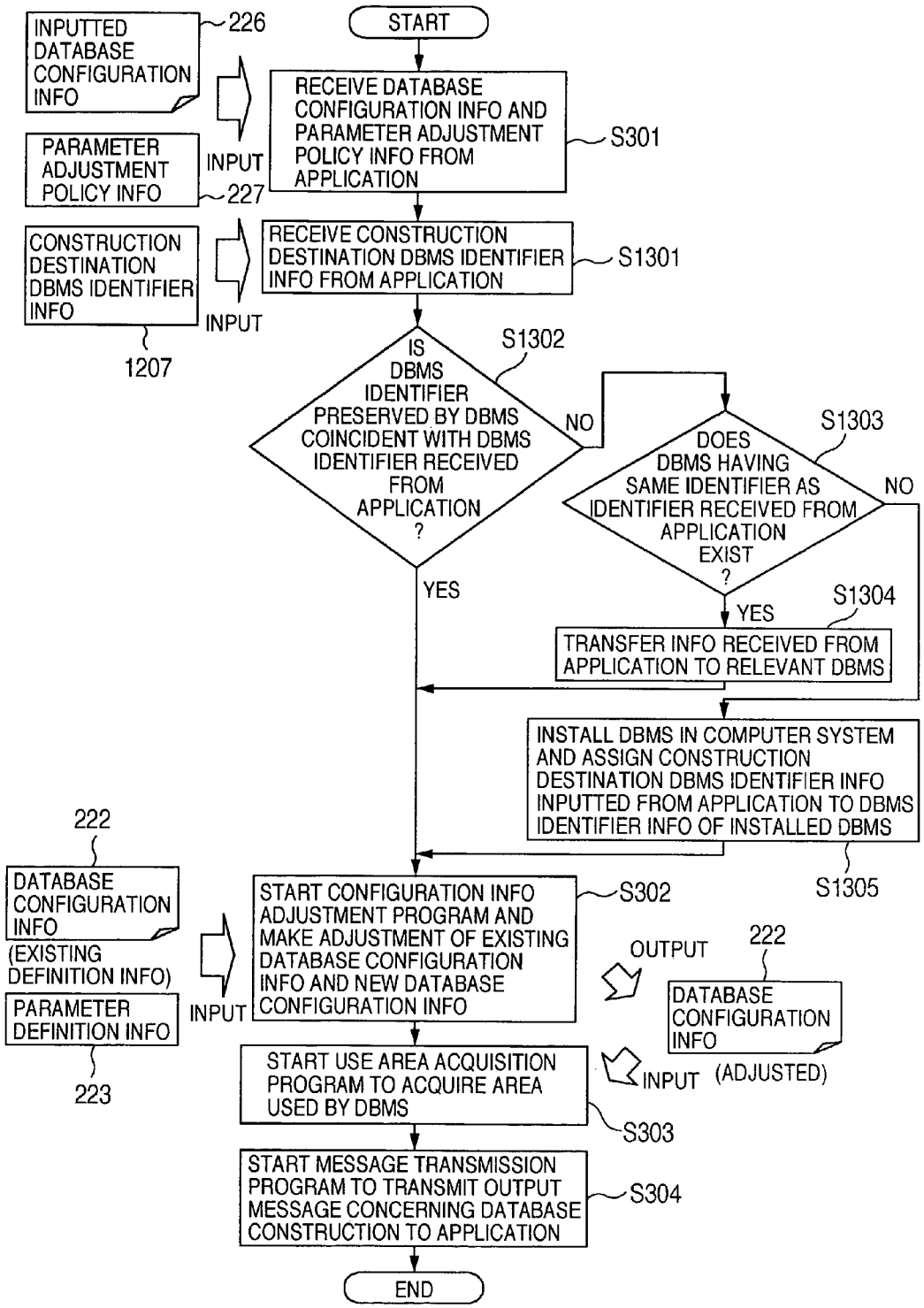
FIG. 13 is a flowchart showing construction processing of a database in the second embodiment of the present invention.
Figure 14:
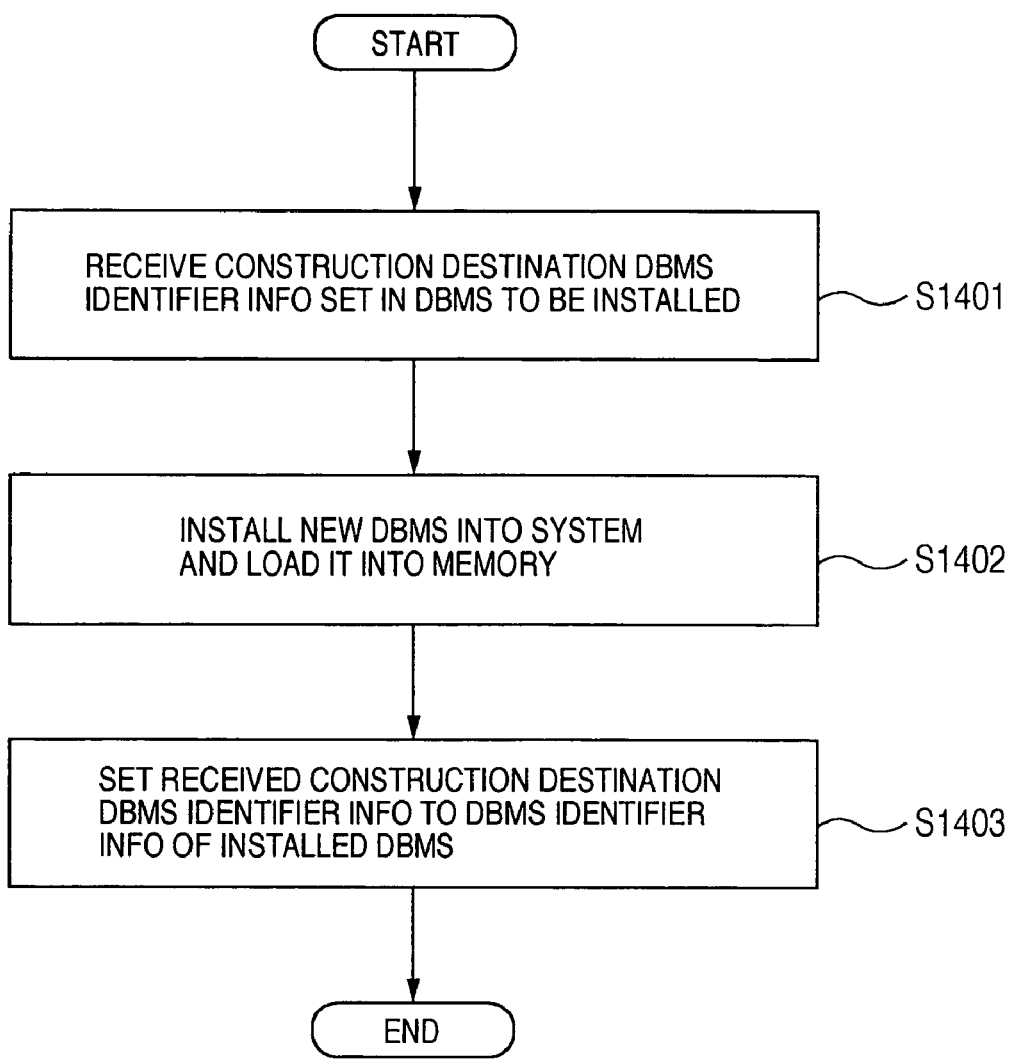
FIG. 14 is a flowchart showing a processing procedure of a database management system installation program in the second embodiment of the present invention.
Figure 15:
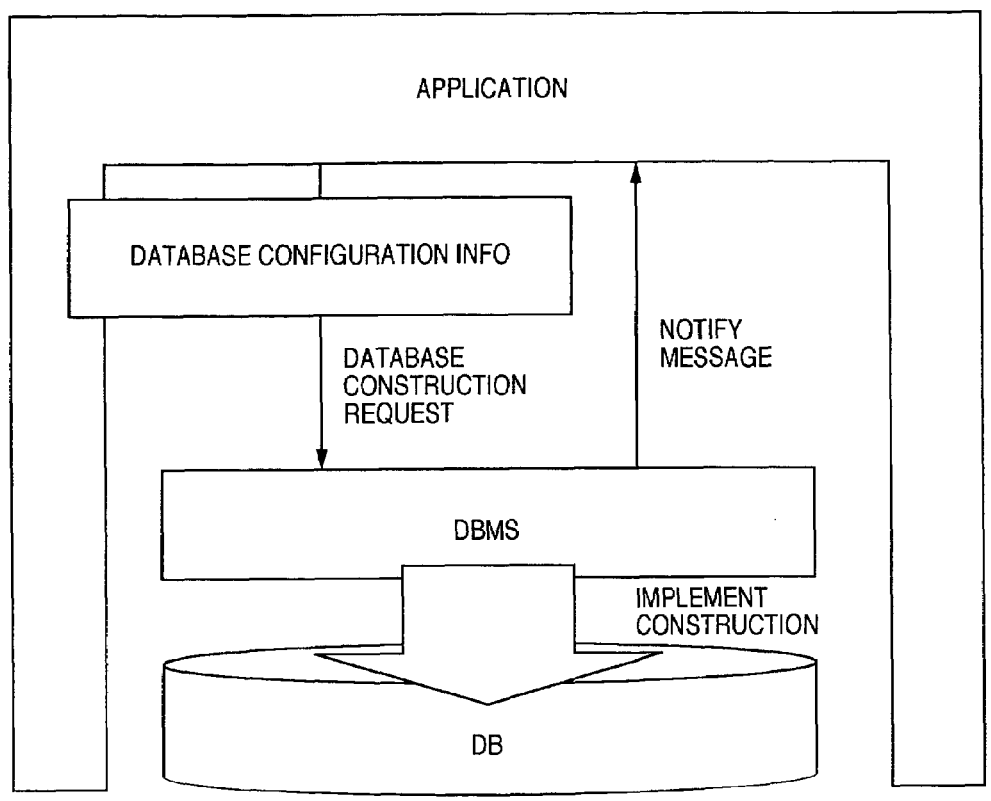
FIG. 15 is a diagram illustrating an outline of a database construction method in a prior art.

Referring now to FIGS. 12 to 14, a second embodiment of the present invention is described. The second embodiment is different from the database construction processing of the first embodiment in that the database construction processing is changed so that when a plurality of DBMSs exist in one computer system, an application requiring the database construction can select any DBMS to be used and request the DBMS to construct the database.

<Configuration of System>

FIG. 12 is a schematic diagram illustrating a computer system according to the second embodiment of the present invention. The configuration of the computer system implementing the database operation management method of the embodiment shown in FIG. 12 is almost the same as that of FIG. 2.

The application program group 211, a database management system program group 1201, a database management system installation program 1206, the system program 219, the work area 220, the inputted database configuration information 226, the parameter adjustment policy information 227 and construction destination DBMS identifier information 1207 are stored in the main memory 209.

The database management system program group 1201 is one or more collected database management system programs 212.

The database management system program 212 includes DBMS identifier information 1205 in addition to the programs shown in FIG. 2. The DBMS identifier information 1205 is information for uniquely identifying the database management system program 212 existing in the computer system of the embodiment. The DBMS identifier information 1205 is given to the database management system program 212 to be uniquely identified in the database management system program group 1201 when the database management system program 212 is installed.

In the embodiment, the DBMS identifier information 1205 is given when the database management system program 212 is installed, although as far as the DBMS identifier information 1205 can be established uniquely in the system, the DBMS identifier information 1205 may be given from the outside such as an application after installation of the database management system program 212.

The construction destination DBMS identifier information 1207 is information for designating the DBMS identifier 1205 of the database management system program to which the application program 225 makes a construction request of the database and is used in order for the application program 225 to designate the database management system program 212 to be used.

The application program 225 outputs the inputted database configuration information 226, the parameter adjustment policy information 227 and the construction destination DBMS identifier information 1207 to be supplied to the database management system program 212 when the construction of the database is required.

The database management system installation program 1206 is a program for installing the database management system program 212 to the computer system. The installation of the database management system program 212 is to introduce the database management system program 212 into the computer system newly and dispose it in the main memory 209.

A database group 1202, a database configuration information group 1203 and a parameter definition information group 1204 are stored in the magnetic disk apparatus 210.

The database group 1203 is one or more collected databases 221. Each database 221 contained in the database group 1202 is utilized by each database management system program 212 contained in the database management system program group 1201.

The database configuration information group 1203 is one or more collected database configuration information 222. Each database configuration information 222 contained in the database configuration information group 1203 is utilized by each database management system program 212 contained in the database management system program group 1201.

The parameter definition information group 1204 is one or more collected parameter definition information 223. Each parameter definition information 223 contained in the parameter definition information group 1204 is utilized by each database management system program 212 contained in the database management system program group 1201.

<Database Construction Processing>

FIG. 13 is a flowchart showing the construction processing of the database by the database management system program according to the second embodiment of the present invention. Referring to FIG. 13, the construction of the database by the database management system program 212 is made by the following procedure (refer to FIG. 12 properly).

First, the database management system program 212 receives the inputted database configuration information 226 and the parameter adjustment policy information 227 from the application program 225 (Step S301). Next, the database management system program 212 receives the construction destination DBMS identifier information 1207 from the application program 225 (Step S1301). The database management system program 212 reads out the DBMS identifier information 1205 preserved by the DBMS (database management system program 212) and confirms whether the DBMS identifier information 1205 is coincident with the construction destination DBMS identifier information 1207 received from the application program 225 or not (Step S1302). When it is coincident (YES of Step S1302), the process proceeds to Step S302. When it is not coincident (NO of Step S1302), the database management system program 212 confirms whether the DBMS (database management system program 212) preserving the DBMS identifier information 1205 coincident with the construction destination DBMS identifier information 1207 exists in the computer system or not (Step S1303). When it exists (YES of Step S1303), the database management system program 212 transfers the inputted database configuration information 226 and the parameter adjustment policy information 227 received from the application program 211 to the relevant DBMS (database management system program 212) (Step S1304). When it does not exist (NO of Step S1303), the database management system program 212 starts the database management system installation program 1206 to install DBMS (database management system program 212) in the computer system newly and assigns the construction destination DBMS identifier information 1207 inputted from the application program 225 to the DBMS identifier information 1205 of the installed database management system program 212 (Step S1305).

Thereafter, the database management system program 212 starts the configuration information adjustment program 213 and reads out the existing database configuration information 222 and the parameter definition information 223 inputted from another application using the DBMS to thereby make adjustment of the existing database configuration information 222 and the inputted database configuration information 226 in accordance with the parameter adjustment policy information 227 (Step S302). As a result of the adjustment, the adjusted database configuration information 222 is stored in the magnetic disk apparatus 210. The database management system program 212 starts the use area acquisition program 217 to acquire the area used by DBMS 212 in accordance with the contents of the database configuration information 222 (Step S303). Further, the database management system program 212 starts the message transmission program 218 to transmit the end status and the messages concerning the database construction outputted by the configuration adjustment program 213 and the use area acquisition program 217 to the application program 225 (Step S304).

The processing in Step S302 is performed by the configuration information adjustment program 213. The processing in Step S303 is performed by the use area acquisition program 217. The processing in Step S304 is performed by the message transmission program 218. The processing in Step S1305 is performed by the database management system installation program 1206.

<Database Management System Installation Program>

FIG. 14 is a flowchart showing a processing procedure of the database management system installation program in the second embodiment of the present invention. Referring to FIG. 14, the processing procedure of the database management system installation program 1206 is as follows (refer to FIG. 12 properly).

First, the database management system installation program 1206 receives the construction destination DBMS identifier information 1207 inputted from the application program 225 and set in the DBMS to be installed (Step S1401). Next, the database management system installation program 1206 installs a new DBMS into the computer system and loads the program of the DBMS, that is, the database management system program 212 into the main memory 209 to be disposed (Step S1402). The database management system installation program 1206 sets the received construction destination DBMS identifier information 1207 to the DBMS identifier information 1205 of the installed DBMS (Step S1403).

The processing procedure of the configuration information adjustment program 213 in the second embodiment of the present invention is the same as the flowchart of the first embodiment described in FIG. 4.

The database configuration information 222 in the second embodiment of the present invention can use the same configuration and format as those of the database configuration information of the first embodiment described in FIG. 5.

The parameter definition information 223 in the second embodiment of the present invention can use the same configuration and format as those of the parameter definition information of the first embodiment described in FIG. 6.

The processing procedure of the parameter value adjustment program 214 (shown in FIG. 2 but not shown in FIG. 12) in the second embodiment of the present invention is the same as the flowchart of the first embodiment described in FIG. 7.

The processing procedure of the existing setting preference policy adjustment program 215 (shown in FIG. 2 but not shown in FIG. 12) in the second embodiment of the present invention is the same as the flowchart of the first embodiment described in FIG. 8.

The processing procedure of the input setting preference policy adjustment program 216 (shown in FIG. 2 but not shown in FIG. 12) in the second embodiment of the present invention is the same as the flowchart of the first embodiment described in FIG. 9.

The processing procedure of the use area acquisition program 217 in the second embodiment of the present invention is the same as the flowchart of the first embodiment described in FIG. 10.

The processing procedure of the message transmission program 218 in the second embodiment of the present invention is the same as the flowchart of the first embodiment described in FIG. 11.

As described above, according to the database construction method of the embodiment, when several DBMSs exist in one computer system, the application can select a DBMS used for construction of the database and can adjust the contents of the database configuration information inputted from the individual applications in accordance with the adjustment policy designated by the application. Accordingly, one DBMS can be shared with a plurality of applications independent of the order of installing the applications and the combination thereof in the environment where the plurality of DBMSs exist.

The embodiments of the present invention have been described, in which the database sharing system and the database construction method according to the embodiments of the present invention are to be realized by recording the programs executed by the computer system shown in FIGS. 2 and 12 in a recording medium readable by the computers and reading the programs recorded in the recording medium in the computer system to be executed.

Other Embodiments

The foregoing has described the examples of the preferred embodiments of the present invention, although the present invention is not limited to the above embodiments and can be modified properly without departing from the scope and the spirit of the present invention. For example, in the embodiments, the application program 225 and the database management system program 212 are loaded in the same main memory 209, although the programs may be loaded in physically separate memories. Further, the programs may be installed in a client and server connected through the network. In this case, the database management system program 212, the magnetic disk apparatus 210 and the like are provided in the server and operate in response to a database construction request received through the network from the application 225 provided in the client. Thus, the database construction method according to the embodiment of the present invention can be applied to the database sharing system connected through the network.

According to the present invention, since adjustment between the database configuration information newly inputted from the application and the database configuration information already existing in the DBMS is made when a plurality of applications are operated by means of one DBMS resource, one DBMS resource can be shared with the plurality of applications properly independent of the order of installing the applications and the combination thereof.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A database construction method of constructing a database in a database management system provided in a predetermined computer and used by a plurality of applications, wherein said database management system implements said database construction method comprising:

inputting a set of database configuration information containing execution environment and configuration of the database from a first application;

confirming whether a set of database configuration information already inputted from a second application different from the first application is stored in memory means provided in said predetermined computer or not;

adjusting contents of the set of database configuration information inputted from the first application and contents of the set of database configuration information already inputted from the second application, and constructing the database in accordance with contents of a set of the adjusted database configuration information in common to the first and second applications if the set of already inputted database configuration information is determined to be stored as a result of the confirmation, thereby to avoid presence of sets of database configuration information specific to said plurality of applications; and constructing the database in accordance with contents of the set of database configuration information inputted from the first application as the set of adjusted database configuration information in common to the first and second applications if the set of already inputted database configuration information is determined not to be stored as a result of the confirmation.

2. The database construction method according to claim 1, wherein said database management system implements said database construction method comprising:

inputting, from the first application, parameter adjustment policy information indicative of a preference order of a parameter value to be used at a time when the execution environment and the configuration of the database described in the set of database configuration information are adjusted; and modifying the contents of the set of adjusted database configuration information in accordance with the preference order of the parameter value indicated by said parameter adjustment policy information.

3. The database construction method according to claim 2, wherein said parameter adjustment policy information contains one of a policy that a first parameter value which is a parameter value of the set of database configuration information newly inputted from the first application is used preferentially, a policy that a second parameter value which is a parameter value of the set of database configuration information already inputted from the second application is used preferentially, and a policy that either of said first and second parameter values is not used preferentially.

4. The database construction method according to claim 3, wherein
said database management system implements said database construction method comprising, if said parameter adjustment policy information contains the policy that said first parameter value is used preferentially:
updating, if a parameter value corresponding to said first parameter value is already stored in said memory means, said stored parameter value to have said first parameter value; and
setting, if a parameter value corresponding to said first parameter value is not stored in said memory means, said first parameter value as a new parameter value.

5. The database construction method according to claim 3, wherein
said database management system implements said database construction method comprising, if said parameter adjustment policy information contains the policy that said second parameter value is used preferentially;
using, if a parameter value corresponding to said first parameter value is already stored in said memory means, said stored parameter value as it is; and
setting, if a parameter value corresponding to said first parameter value is not stored in said memory means, said first parameter value as a new parameter value.

6. The database construction method according to claim 3, wherein
said database management system implements said database construction method comprising:
previously preserving in said memory means an adjustment method of making adjustment between said first parameter value and said second parameter value for each parameter of the set of database configuration information; and
if said parameter adjustment policy information contains the policy that either of said first and second parameter values is not used preferentially:
updating, if a parameter value corresponding to said first parameter value is already stored in said memory means, said stored parameter value to have a value obtained from a result of the adjustment between said first parameter value and said stored parameter value in accordance with said adjustment method; and
setting, if a parameter value corresponding to said first parameter value is not stored in said memory means, said first parameter value as a new parameter value.

7. The database construction method according to claim 1, wherein
said database management system comprises:
previously preserving DBMS (Database Management System) identifier information for uniquely identifying said database management system residing in said predetermined computer;
receiving said DBMS identifier information from said first application;
confirming whether contents of said received DBMS identifier information is coincident with contents of said preserved DBMS identifier information or not; and
implementing construction of the database if the contents of said DBMS identifier information are coincident with each other as a result of the confirmation.

8. A database construction system having a predetermined computer,
wherein said database construction system comprises:
a plurality of applications which are to share a set of database configuration information containing an execution environment and configuration of a database;
a database management system for making adjustment between sets of database configuration information received from said plurality of applications and constructing the database in accordance with a set of adjusted database configuration information, thereby to avoid presence of sets of database configuration information specific to said plurality of applications; and
memory means for storing the database and said the set of adjusted database configuration information,
wherein an application of said plurality of applications requiring construction of the database transmits to said database management system a database construction request message containing:
the set of database configuration information; and
parameter adjustment policy information indicative of a preference order of a parameter value of the set of database configuration information to be used at a time when the parameter value is adjusted, and
wherein said database management system:
receives said database construction request message from said application; and
makes adjustment between the parameter value of the database configuration information contained in said database construction request message and a parameter value of the set of database configuration information stored in said memory means in accordance with the preference order of the parameter value indicated by said parameter adjustment policy information contained in said database construction request message, and stores an adjusted parameter value in said memory means as a new parameter value to make construction of the database in accordance with said new parameter value.

9. A database construction system comprising:
a plurality of clients each thereof having at least an application to share a set of database configuration information containing execution environment and configuration of a database with another application; and
a server including: a database management system for making adjustment between sets of database configuration information of the applications, with the sets of database configuration information being received from the applications, and constructing the database in accordance with the set of adjusted database configuration information, thereby to avoid presence of sets of database configuration information specific to said plurality of applications; and memory means for storing the database and said adjusted database configuration information,
wherein said plurality of clients and said server are connected through a network to said database construction system,
wherein an application of the applications requiring construction of the database transmits to said database management system a database construction request message containing:
the database configuration information; and
parameter adjustment policy information indicative of a preference order of a parameter value of the set of database configuration information to be used at a time when the parameter value is adjusted, and
wherein said database management system:
receives the database construction request message from the application; and
makes adjustment between the parameter value of the set of database configuration information contained in said database construction request message and a parameter value of the set of database configuration information stored in said memory means in accordance with the preference order of the parameter value indicated by said parameter adjustment policy information contained in said database construction request message, and stores an adjusted parameter value in said memory means as a new parameter value to make construction of the database in accordance with said new parameter value.

10. A database construction method of constructing a database in a database management system provided in a predetermined computer, where the database is to be commonly used by a plurality of applications, wherein said database management system implements said database construction method comprising:

inputting a set of database configuration information containing execution environment and configuration of the database from a first application;

confirming whether a set of database configuration information already inputted from a second application different from the first application is stored in memory means provided in said predetermined computer or not;

adjusting contents of the set of database configuration information inputted from the first application and contents of the set of database configuration information already inputted from the second application to derive a set of adjusted database configuration information, and constructing the database in accordance with contents of the set of the adjusted database configuration information if the set of already inputted database configuration information is determined to be stored as a result of the confirmation, thereby to avoid constructing the database in accordance with the set of database configuration information inputted by, and specific to, either of said first and second applications; and constructing the database in accordance with contents of the set of database configuration information inputted from the first application as the set of adjusted database configuration information in common to the first and second applications, if the set of already inputted database configuration information is determined not to be stored as a result of the confirmation.

\* \* \* \* \*